Patented Oct. 10, 1950

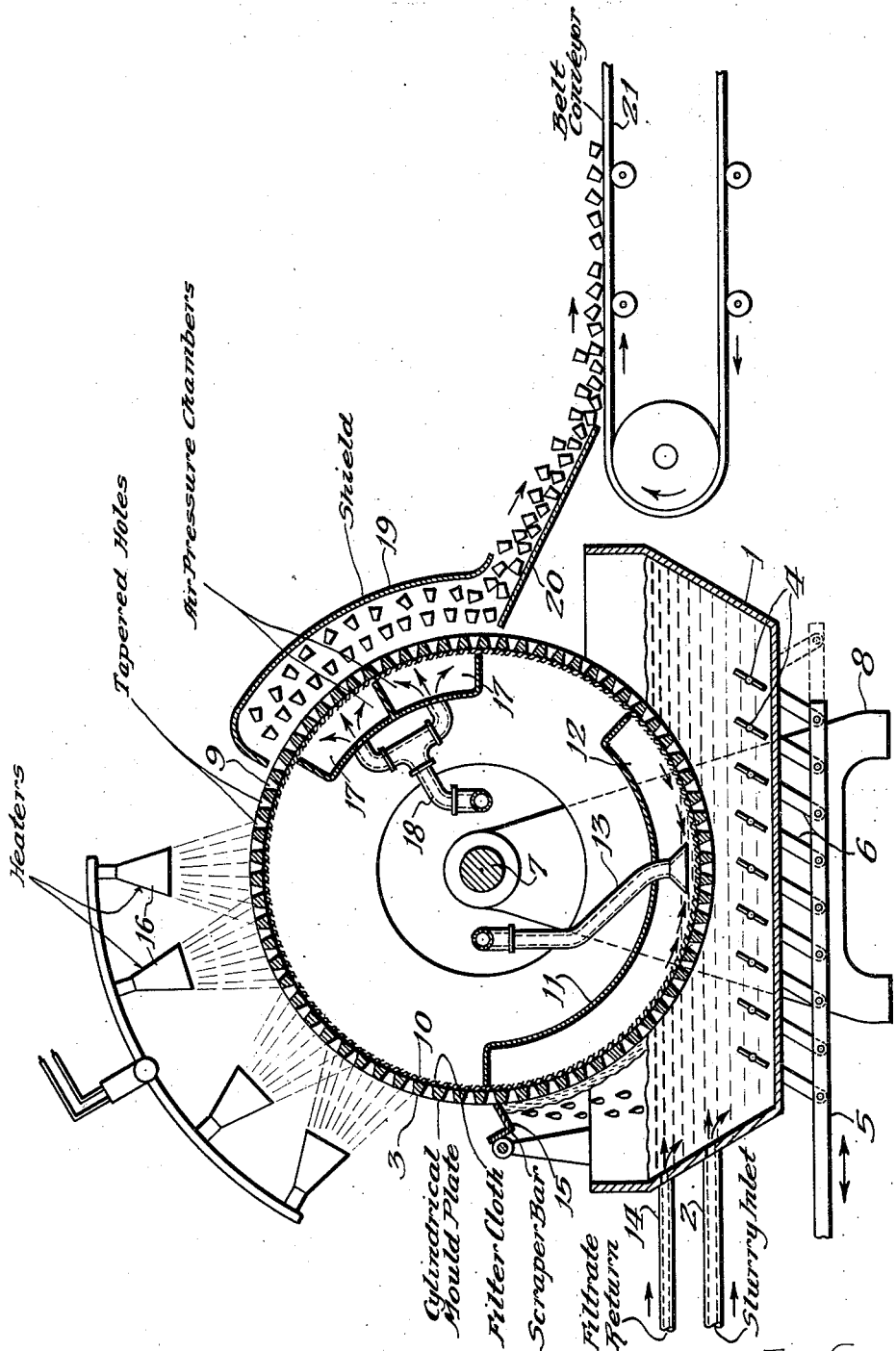

2,525,135

UNITED STATES PATENT OFFICE 2,525,135

APPARATUS FOR FORMING PILLS OR PELLETED PARTICLES

Lyman C. Huff, Evanston, Ill., assignor to Universal Oil Products Company, Chicago, Ill., a corporation of Delaware Application September 13, 1946, Serial No. 696,788

8 Claims. (Cl. 18—21)

1

This invention relates to an improved apparatus for forming pills or pelleted shaped particles from a slurry of solid material in a liquid-suspending medium.

This invention may be used to form all manner of pills, pellets, small briquettes or the like, from slurries of hydrogels or of solid matter of all types; however, the operating method and the apparatus is particularly adapted for manufacturing catalyst pellets for use in the chemical and petroleum industries. Such catalysts are normally inorganic oxide compounds or composites that have been found to aid in promoting various chemical conversion operations. For example, a silica oxide catalyst may be formed by the controlled mixing of a sodium silicate, commercially called "water glass," and an acid such as sulfuric acid, to form a sol. The sol subsequently may be allowed to set into a firm gel or hydrogel. The hydrogel may be dried, hardened and ground in order that it be used as a powdered catalyst; it may be formed into spherical shapes by spraying operations, or it may be formed into pellets such as by the method of this invention.

Sols have also been formed directly into spherical shapes by the use of atomizing or centrifugal spraying apparatus which forms small droplets of the hydrosol which in turn are formed into a gel of spherical shape.

The principal object of this invention is to provide means for manufacturing pills or pellets of a solid material from a suspension or fluid like slurry containing solid matter.

Another object of this invention is to provide an easy and economical means for forming catalyst pellets which are not round or spherical shaped as are the ones manufactured by the spraying or dropping method.

It is frequently desired to form and provide spherical and uniformly sized particles from a ground or powdered solid material, in which case some molding or pilling process is necessary to attain a given shaped particle. In other instances, it may be one particular shape is preferable to another for a given operation. This latter reason is true in the preparation of catalysts for different chemical conversion processes. For instance, a spherical catalyst is preferable if the catalyst particles are moved from one zone to another by a fluid medium or where they descend by gravity in a moving bed operation. However, when catalyst is mechanically carried from one zone to another or is used in a fixed contact bed, then other than spherical forms may be found preferable. Also, of considerable importance is the fact that a pilled or pelleted form of catalyst may have a preferable internal structure, for catalytic conversion operations, by having greater porosity and contact area.

The present invention comprises forming a slurry of a solid material or a hydrogel, passing slurry into an agitating tank or trough, continuously passing a perforated and endless belt type of molding plate through a slurry and applying suction to the inner face of the continuous molding plate such that solid material is drawn into the perforations to form pellet-like particles or pills. The liquid suspending medium from the slurry is drawn through the mold plate and through a filter cloth or sheet which backs up the mold plate on its inner face. Excess solid material is scraped off the outer face or surface of the mold plate, following its immersion in a slurry tank, while the remaining material in the perforations or recessed portions of the plate is allowed to set and dry to form the desired uniformly shaped pills. The material in the perforations is also, preferably, subjected to heating means that will provide quick drying and a slight shrinkage of the particles being formed, so that they are more easily removed from the mold. The rotating or moving mold plate passes from the drying zone to an ejection zone wherein fluid pressure from steam, compressed air, or the like, may be employed to dislodge and blow out the formed pellets from the molded plate. The pellets after ejection may fall onto a moving belt or other conveying means to be transferred to subsequent treating steps which may be desirable. The liquid suspending medium, which is drawn through the mold plate and filter sheet by the suction means provided, may be recovered and recycled to the slurry tank.

The method of operation of this invention is continuous, efficient and easily controlled. Of course, varying forms of the apparatus, to carry out the manufacture, may be devised by varying the structural and mechanical features.

The accompanying drawing shows one form of the apparatus and the following is a description and explanation of the operation of the apparatus for manufacturing pills or pelleted particles of catalyst, or of any other solid material which may be formed in a similar manner.

Referring now to the drawing, the tank 1 receives a slurry of hydrogel, or other suspension, by way of inlet line 2, and maintains a shallow pool of the slurry therein for the immersion of a rotating cylindrical mold plate 3. In the lower portion of tank 1, there are a plurality of agitating blades or plates 4, which are continuously oscillated or moved back and forth by means of a reciprocating rod 5, and connecting bars 6. These agitating blades serve to circulate and agitate the liquid medium and to prevent settling out of the suspended solid material. The cylindrical mold plate 3 is rotated and supported by means of shaft 7, which is in turn supported at each end by supports 8. The shaft 7 and the drum 3 is continuously rotated by a motor or other conventional means which need not be illustrated.

The mold plate 3 is perforated with a multiplicity of small tapered holes 9. Holes 9 may be conical, pyramidal, or of any other desired shape, however, the holes are preferably tapered such that solid material being molded therein is easily removed. The inner face of the molded plate is provided with, or "backed-up" with, a filter cloth 10, such that solid material is retained in the tapered perforations with liquid suspending medium from the slurry being pulled therethrough by vacuum producing means. Plate 11 is fixedly mounted above the tank 1 and the inner face of the mold plate 3 to form a high vacuum chamber or suction zone 12 whereby the solids from the slurry will be pulled into the tapered perforations 9 within the mold plate 3, as the latter passes through the slurry in the tank 1. The conduit 13 connects the vacuum zone 12 with a vacuum producing means and serves to provide suction in the zone and to remove liquid filtrate which passes through the filter cloth 10. The liquid filtrate which is removed through the line 13 may be subsequently separated and recovered and recycled to tank 1 by means of filtrate return line 14.

A scraper bar 15 is positioned outside of the cylindrical mold plate 3 and opposite the end of the suction zone 12 such that excess solids may be scraped from the outer face of the mold plate and uniformly sized pellets thus formed within the perforations 9. The excess material removed by the scraper bar 15 drops into the tank 1 and therein becomes mixed with the slurry by means of agitator blades 4; thus, the excess solid material is again slurried and made usable.

The solid material within the perforations 9 will begin to set and dry into molded particles, as the continuously moving mold plate leaves the suction zone 12. However, in a preferable form of the apparatus, heaters 16 are provided, so that there may be rapid heating and drying of the particles within the mold plate 3, with perhaps some shrinking of the material away from the sides of the perforations 9. The heating means 16 is mounted along side of the rotating drum and may be infra-red lamps, electrical coils, steam plates, or any other common type of heating apparatus.

Subsequent to the heating and drying operation, the formed pellets within the mold plate are passed by an ejection zone. At the ejection zone, pressure chambers 17 are positioned on the filter cloth side of the mould or within the rotating mold plate 3 and they are in turn maintained under pressure by means of a fluid medium which may be passed by way of conduit 18. The pressure medium may be compressed air, steam, or other fluid medium. The ejection fluid, however, should preferably be of a gaseous nature, unless it is desired to transfer or wash the pelleted particles in a liquid medium. The compressed air, or other gas, from chamber 17, automatically ejects or blows out the formed pellets from the mold plate 3 as it rotates past the ejection zone. A shield 19 is mounted along side of the rotating mold plate at the zone and serves to deflect or channel the pelleted particles onto a chute 20 and to a belt conveyor 21. The belt conveyor is operative to carry the dried and formed pellets to subsequent treating steps or to a loading zone, which are not part of this invention and are not illustrated. However, the pellets, following their ejection, are preferably conveyed to a second drying zone to effect a more complete drying and hardening. It is not intended that the drying operation as provided by heaters 16 should constitute the complete drying of the pellets, for only sufficient moisture need be removed from the pellets to render them firm enough for ejection and to give them sufficient strength for subsequent conveying and handling operations.

It is not intended to limit the form and construction of the apparatus of this invention to the exact type which has been illustrated and described. As has been noted, various portions of the device may be altered and various mechanical substitutions may be made in its construction. For instance, the mold plate 3 need not be cylindrical in shape, nor of rigid construction, i. e., the mold plate may be made flexible and constructed more in the manner of a conveyor or endless belt. Also, the tapered holes 9 may be of any desired shape and size. However, regardless of form, the holes or perforations should preferably have a slight taper such that the outer periphery of the hole is greater than the inner and so that solid particles or pills which are formed therein may be easily removed.

I claim as my invention:

1. Apparatus for forming pellets from a slurry of solid material which comprises in combination a slurry tank, a movable and endless type of mold sheet, a multiplicity of pellet-forming perforations extending through said mold sheet with said mold arranged to pass continuously through said slurry tank, said perforations being separated from each other by solid imperforate portions of the mold sheet, a filter sheet mounted on the inner face of said mold sheet, suction means positioned above said slurry tank and within the periphery of said endless mold sheet, with said suction means operative to draw solid material from said slurry tank into said perforations and to draw liquid suspending medium through said filter sheet whereby to form a plurality of separated pellets in said perforations, a fluid pressure chamber fixedly positioned adjacent said movable mold and within the periphery, means for supplying a fluid pressure medium to said pressure chamber with the latter operating to eject said separated pellets from said perforations as said moving mold passes thereby, collecting and transporting means outside of and adjacent said moving mold and opposite said pressure chamber, with said last means operative to receive and transfer the ejected pellets.

2. Apparatus for forming pellets from a solids slurry which comprises in combination an open slurry tank, means to maintain a slurry within said tank, a movable drum shaped mold plate, a multiplicity of pellet forming perforations extending through said mold plate, said perforations being separated from each other by solid imperforate portions of the mold plate, a filter sheet mounted on the inner periphery of said mold plate, means for passing the outer periphery of said mold plate through said slurry and said slurry tank, a suction chamber positioned above said slurry tank and adjacent the inner periphery of said mold plate, a conduit connecting said suction chamber with vacuum producing means whereby said suction chamber is operative to draw solids from said slurry into the perforations of said mold and form a plurality of separated pellets in said perforations, heating means positioned adjacent the outer periphery of said mold and operating to dry solids carried within said perforations on said mold leaving said slurry tank, a pressure chamber positioned adjacent the inner periphery of said mold and on the side of said filter sheet, means for supplying a fluid pressure medium to said pressure chamber, and said chamber operating to exert fluid pressure against pellets formed within said mold and to eject them from the latter, a deflection plate and pellet removal means positioned opposite said pressure chamber adjacent the outer periphery of said drum shaped mold with the last-named plate and means operating to receive and transfer ejected pellets.

3. The apparatus of claim 2 further characterized in that said perforations are tapered inwardly from the outer to the inner periphery of said mold plate whereby said separated pellets may be easily ejected from said drum shaped mold.

4. An apparatus of the class described comprising a tank, means for supplying a slurry of solid material to the tank, a cylindrical hollow drum mounted for rotation through the tank, pellet-forming recesses extending through and spaced around the periphery of the drum, said recesses being separated from each other by solid imperforate portions of the drum, a filter sheet on the inner surface of the drum, suction means for drawing slurry from said tank into said recesses whereby to form a plurality of separated pellets in the recesses, and fluid pressure means for ejecting said separated pellets from said recesses.

5. An apparatus of the class described comprising a tank, means for supplying a slurry of solid material to the tank, a cylindrical hollow drum mounted for rotation through the tank, pellet-forming recesses extending through and spaced around the periphery of the drum, said recesses being separated from each other by solid imperforate portions of the drum and being tapered inwardly from the outer to the inner surface of the drum, a filter sheet on the inner surface of the drum, suction means for drawing slurry from said tank into said recesses whereby to form a plurality of separated pellets in the recesses, and fluid pressure means for ejecting said separated pellets from said recesses.

6. An apparatus of the class described comprising a tank, means for supplying a slurry of solid material to the tank, a cylindrical hollow drum mounted for rotation through the tank, pellet-forming recesses extending through and spaced around the periphery of the drum, said recesses being separated from each other by solid imperforate portions of the drum, a filter sheet on the inner surface of the drum, heating means for the drum disposed outside said tank, suction means for drawing slurry from the tank into said recesses whereby to form a plurality of separated pellets in the recesses, scraper means contacting the outer surface of the drum at a point in its rotation between the tank and said heating means, and fluid pressure means for ejecting said separated pellets from said recesses in the path of travel of the drum from the heating means to said tank.

7. The apparatus as defined in claim 6 further characterized in that said recesses are tapered inwardly from the outer to the inner surface of said drum.

8. An apparatus of the class described comprising a tank, means for supplying a slurry of solid material to the tank, a cylindrical hollow drum mounted for rotation through the tank, pellet-forming recesses extending through and spaced around the periphery of the drum, said recesses being separated from each other by solid imperforate portions of the drum, a filter sheet on the inner surface of the drum, a stationary suction chamber within the drum adjacent a portion of the filter sheet and arranged to draw solid material from said tank into said recesses whereby to form a plurality of separated pellets in the recesses, means for applying suction to said chamber, a stationary pressure chamber within the drum adjacent another portion of the filter sheet and positioned exteriorly of said tank, means for supplying a fluid pressure medium to the last-named chamber to eject said separated pellets from said recesses, and means for heating the drum in its travel from said suction chamber to said pressure chamber.

LYMAN C. HUFF.

REFERENCES CITED

The following references are of record in the file of this patent:

UNITED STATES PATENTS

| Number | Name | Date |
|---|---|---|
| 1,537,195 | Salisbury | May 12, 1925 |
| 1,979,819 | Beckman et al. | Nov. 6, 1934 |
| 2,020,687 | Kinsella | Nov. 12, 1935 |
| 2,152,101 | Scherer | Mar. 28, 1939 |
| 2,219,578 | Pittenger | Oct. 29, 1940 |
| 2,329,553 | Newbould | Sept. 14, 1943 |